No. 645,339. Patented Mar. 13, 1900.
F. M. THOMPSON.
EYEGLASSES.
(Application filed June 3, 1899.)
(No Model.)
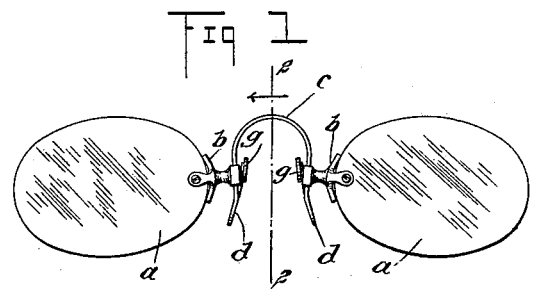
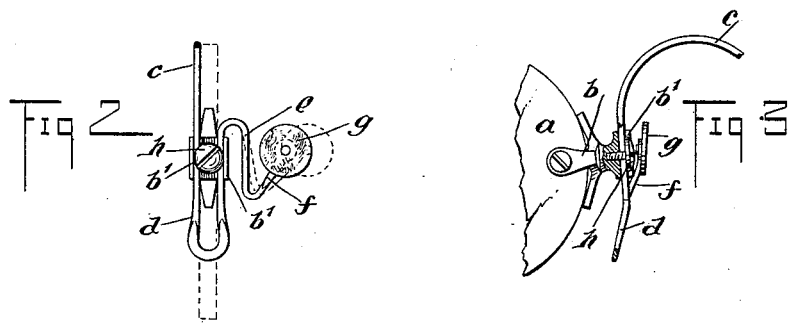
WITNESSES:
INVENTOR
Frank M Thompson
BY
ATTORNEYS
THE NORRIS PETERS CO., PHOTO-LITHO., WASHINGTON, D. C.

UNITED STATES PATENT OFFICE.

FRANK MARION THOMPSON, OF WILMINGTON, DELAWARE, ASSIGNOR OF ONE-HALF TO WILLIAM G. BRYAN, OF SAME PLACE.

EYEGLASSES.

SPECIFICATION forming part of Letters Patent No. 645,339, dated March 13, 1900.

Application filed June 3, 1899. Serial No. 719,335. (No model.)

*To all whom it may concern:*

Be it known that I, FRANK MARION THOMPSON, of Wilmington, in the county of New Castle and State of Delaware, have invented a new and useful Improvement in Eyeglasses, of which the following is a full, clear, and exact description.

This invention relates to a peculiar construction of the bridge of eyeglasses, the object being to provide better means for attaching and adjusting the bridge with respect to the lenses.

This specification is the disclosure of one form of my invention, while the claims define the actual scope thereof.

Reference is to be had to the accompanying drawings, forming a part of this specification, in which similar characters of reference indicate corresponding parts in all the views.

Figure 1 is a front elevation of the invention in use. Fig. 2 is a view showing the bridge in section on the line 2 2 of Fig. 1. Fig. 3 is a detail section showing the manner of attaching the bridge to the lenses.

Each of the lenses $a$ is provided with a bracket $b$, which brackets have their inner ends formed square and each provided with two parallel flanges $b'$. The bridge $c$ is formed of wire of any desired shape, and the end portions are each bent twice to form loops $d$ and $e$, the bridge-wire terminating in a short arm $f$, which carries a small plate $g$, preferably of tortoise-shell, which plates are adapted to engage the nose of the person to hold the eyeglasses in place. The bridge is fastened to the brackets $b$ by means of screws $h$, which are one for each bracket and lie between the flanges $b'$ of the respective brackets, so as to engage the heads of the screws with the loops $d$ or $e$, as desired. The lower end of each loop $d$ is flattened, as shown, and this forms a bearing-surface to engage the side of the nose. It will thus be seen that at each side of the bridge two bearing-surfaces are provided. By this arrangement it is possible to effect a great variety of adjustments, thus permitting the lenses to be accurately placed before the eyes. The lenses may be adjusted vertically by moving the brackets $b$ along the lengths of the loops $d$ or $e$, and the lenses may be adjusted toward or from the eyes by changing the brackets from one loop to the other. A further adjustment may be effected by springing the arms $f$ inward or outward in the manner indicated by the dotted lines in Fig. 2.

Having thus described my invention, I claim as new and desire to secure by Letters Patent—

1. A bridge for eyeglasses, the bridge having each end portion bent to form two loops, the one projected upwardly and the other projected downwardly, the loops permitting the adjustable attachment of the bridge to the lenses, the downwardly-projecting loop having its lower end constructed to bear against the nose of the wearer, and a plate mounted at each end of the bridge to form additional bearing-surfaces.

2. A bridge for eyeglasses, the bridge being formed of an integral length of material and having each end portion bent to form a loop permitting the adjustable attachment of the bridge to the lenses, the loop projecting downwardly and having its lower end constructed to bear against the nose of the wearer, thus forming the connection for the lenses and the bearing for the nose of the wearer, and means attached to each end of the bridge to form additional bearings.

FRANK MARION THOMPSON.

Witnesses:
JOHN A. KELLEY,
CHARLES GREEN.